Figure 1:
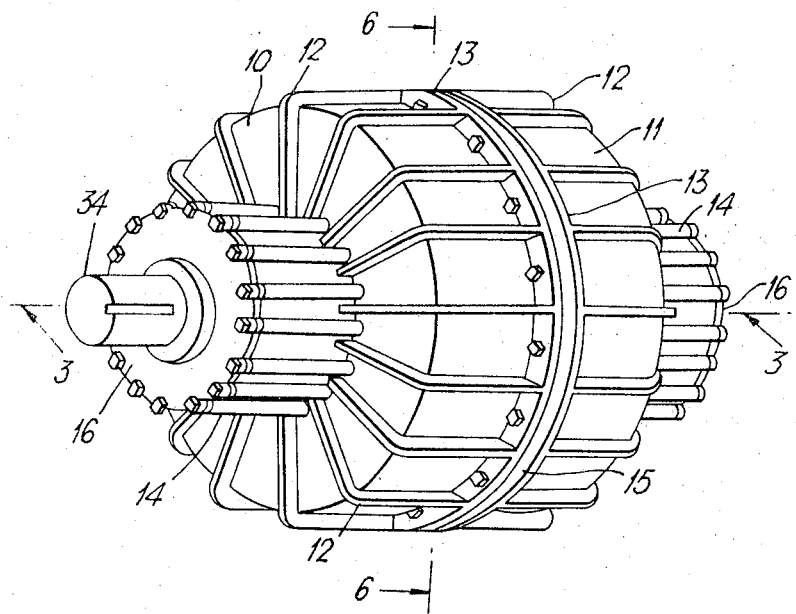

United States Patent [19]
Grecken

[11] 3,841,802
[45] Oct. 15, 1974

[54] ENERGY CONVERSION DEVICE

[75] Inventor: Gene Van Grecken, Sydney, Australia

[73] Assignee: Gvang Motor Company Pty. Limited, Brookvale, New South Wales, Australia

[22] Filed: Feb. 26, 1973

[21] Appl. No.: 335,672

[30] Foreign Application Priority Data
Mar. 10, 1972 Australia............ 39874/72

[52] U.S. Cl. ................................. 418/66
[51] Int. Cl. ............................. F03c 3/00
[58] Field of Search....................... 418/66

[56] References Cited
UNITED STATES PATENTS
| | | | |
|---|---|---|---|
| 448,607 | 3/1891 | Gollings | 418/66 |
| 1,079,560 | 11/1913 | Kinney | 418/66 |
| 1,898,153 | 2/1933 | Tamura | 418/66 |
| 2,584,865 | 2/1952 | Gordinier | 418/66 |
| 3,044,686 | 7/1962 | Makaroff et al. | 418/66 |
| 3,269,646 | 8/1966 | August | 418/66 |
| 3,307,526 | 3/1967 | Betzen | 418/66 |

Primary Examiner—C. J. Husar
Attorney, Agent, or Firm—Owen, Wickersham & Erickson

[57] ABSTRACT

An energy conversion device, typically a motor which is drivable under the influence of an expanding fluid, and which is characterised by a chamber, a piston member mounted eccentrically within the chamber for orbital motion and a partition member of variable effective length extending between the piston and the chamber wall. The relationship of the piston member to the chamber is such that, during any one orbital cycle of the piston member, there are two substantially separate zones of varying volume defined by the periphery of the piston, the wall of the chamber and the partition member.

2 Claims, 9 Drawing Figures

ENERGY CONVERSION DEVICE

This invention relates to an energy conversion device and, in particular, to a motor which is powered by the expansion of a fluid medium delivered thereto. However, the invention is not to be construed as limited solely to a motor; it may be related to, for example, a pump and the expression "energy conversion device" is to be understood in this context.

The device in accordance with the invention may be broadly defined as comprising two back-to-back chambers. A piston member is mounted eccentrically within each chamber for orbital motion within a circumferential wall of the chamber. Inlet and exhaust ports open into the chamber, the respective ports being separated in the direction of orbital motion of the piston member. A partition member extends between a circumferential wall portion of the chamber and a peripheral portion of the piston member, the partition member being disposed intermediate the inlet and exhaust ports and the partition member having an effective length which varies in accordance with the orbital position of the piston member. During any one orbital cycle of the piston member, there are at least two separate or substantially separate zones of varying volume defined by the periphery of the piston member, the circumferential wall of the chamber and the partition member.

The chamber and the piston member abovementioned are both cylindrical in form, the chamber defining a cylindrical cavity and the piston member being constituted by a cylindrical disc which moves in an orbital path between end walls or faces of the chamber. However, it will be appreciated that other constructional forms might also be adopted; the chamber and/or the piston member might be constructed in, for example, elliptical form (in which case the orbital path of the piston member would need to be adapted to suit) and both the chamber and the piston member might be formed as a truncated cone.

The partition member is preferably formed integrally with the piston member and is in the form of a tongue which extends radially outwardly from the periphery of such member. The partition member extends into a circumferential wall portion or pocket of the chamber and is supported therein for pivotal (i.e., oscillatory) and rectilinear movement.

It will be appreciated from the foregoing that the partition member must have an "actual" length at least equal to the maximum spacing which will occur between the circumferential wall of the chamber and the periphery of the piston member during orbital motion of the piston member, but that the portion of the length thereof which extends between the chamber wall and the piston member will vary with orbital motion of the piston member. It is the variable portion of the length of the partition member which is herein referred to as the "effective" length.

The piston member might be disposed within the chamber in such manner that its periphery makes point contact with successive portions of the circumferential wall of the chamber during orbital motion of the piston member but, in the interest of avoiding wear and friction losses, the piston member is preferably disposed to provide a small working clearance between the wall and the piston member periphery. The actual clearance will be dictated by the function of the device and by the viscosity of fluid delivered thereto but, for the purpose of a general description it might be expressed in terms of less than 0.001 inch.

Where clearance between the chamber wall and the piston is provided for, the piston member will not actually function to divide the volume defined by the chamber wall and the piston into two totally separate zones during orbital motion of the piston member, and thus the reference heretofore made to "substantially separate" zones.

The energy conversion device in accordance with the invention has been developed primarily for employment as a motor, in which case the piston member would be connected to an output torque delivery shaft through an eccentric journal and the piston would be driven by the expansion of fluid delivered to the chamber. Expansion of the fluid might be effected by internal combustion, in which case an air fuel mixture would be delivered to and ignited in the chamber, or the expansion might be effected by a pressurised fluid medium such as steam.

The device may however be employed as a shaftless motor; that is, for example, as a vibrator motor or unit; or alternatively, as a pump. In the latter case the piston member would be connected to a drive shaft for the receipt of rotational energy.

Where the device is employed as a motor, it would normally (i.e., preferably) incorporate at least two back-to-back or tandem mounted chambers, each chamber housing a separate piston member and each piston member being connected to a common shaft. Then, to avoid or diminish the effect of any vibrational (centrifugal) forces and to obviate difficulties which might be encountered in top-dead-centre starting of the device, the respective piston members would preferably be located out of phase one with the other(s) in the orbit paths. It will also be appreciated that the greater the number of tandem mounted units, the greater will be the output torque capacity of the total unit.

Figure 2:
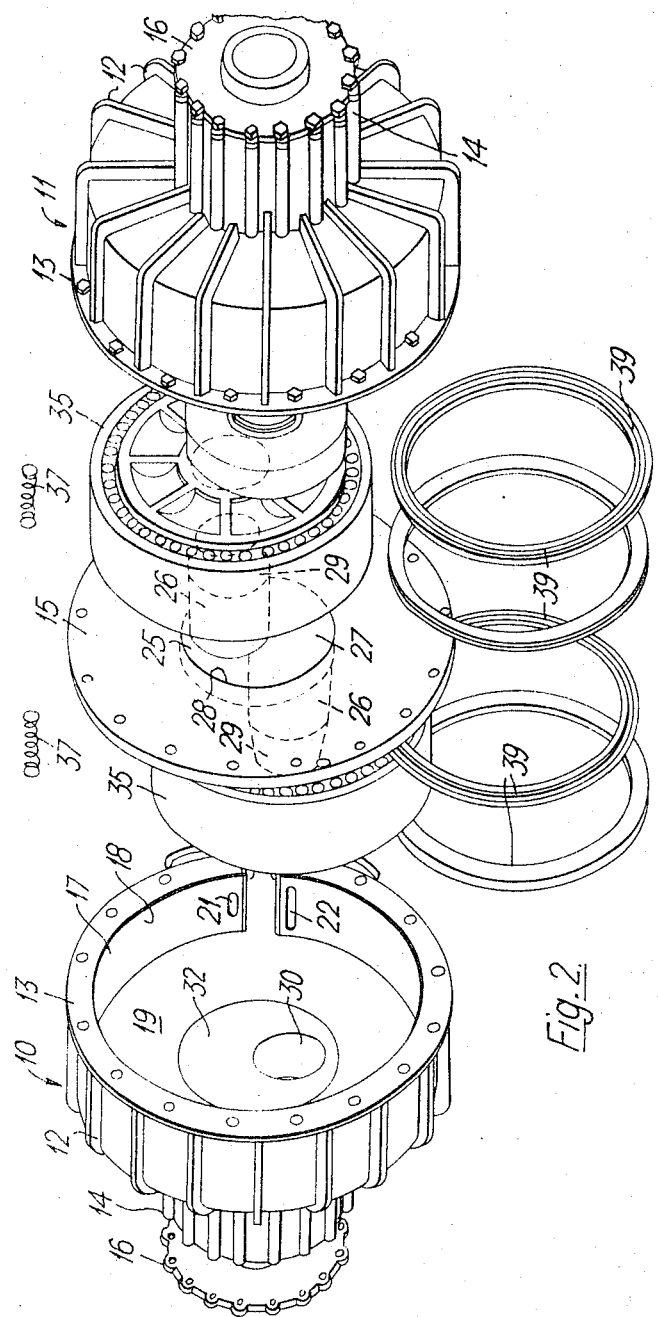
Figure 3:
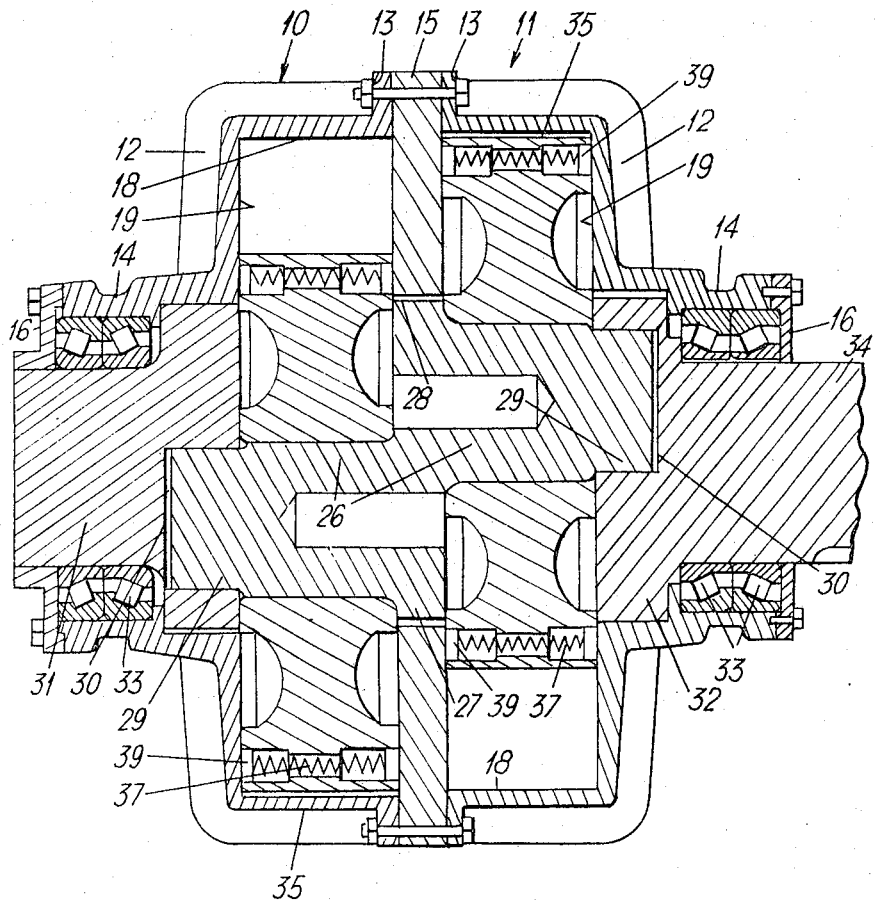
Figure 4:
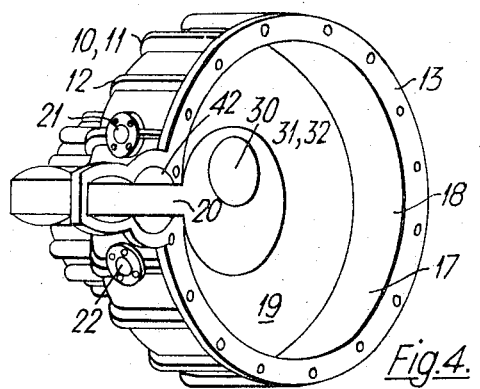
Figure 5:
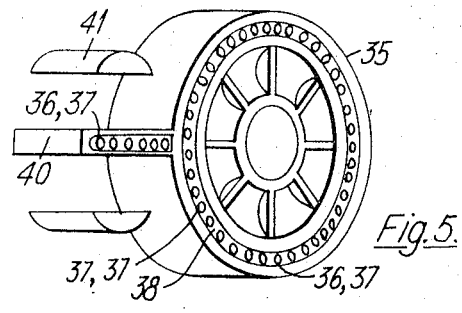
Figure 6:
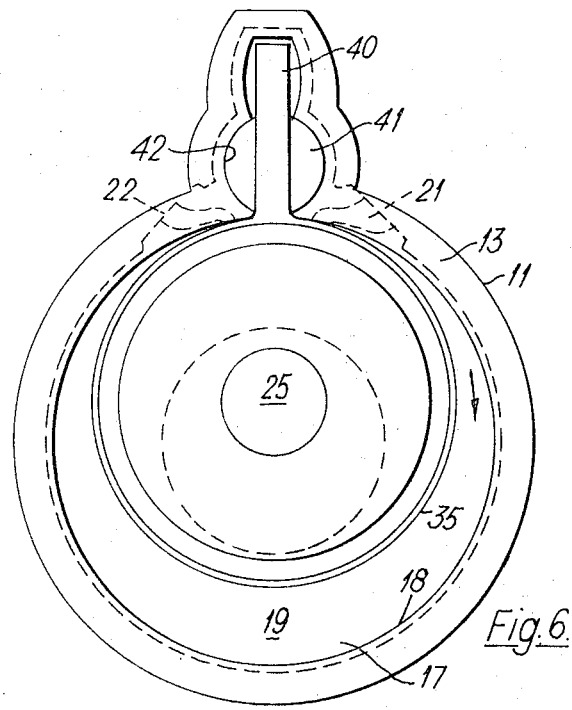
Figure 7:
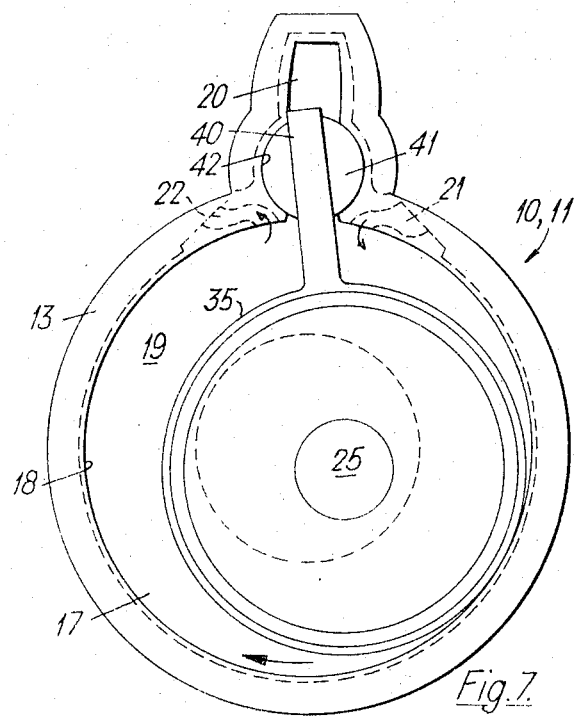
Figure 8:
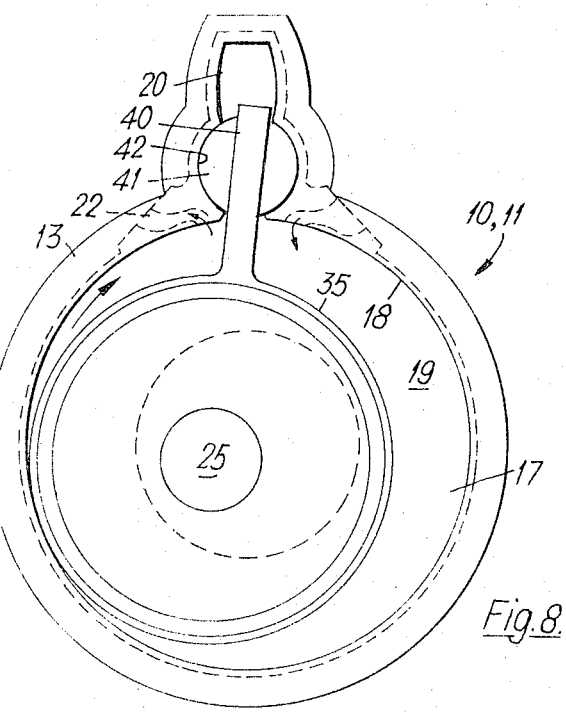
Figure 9:
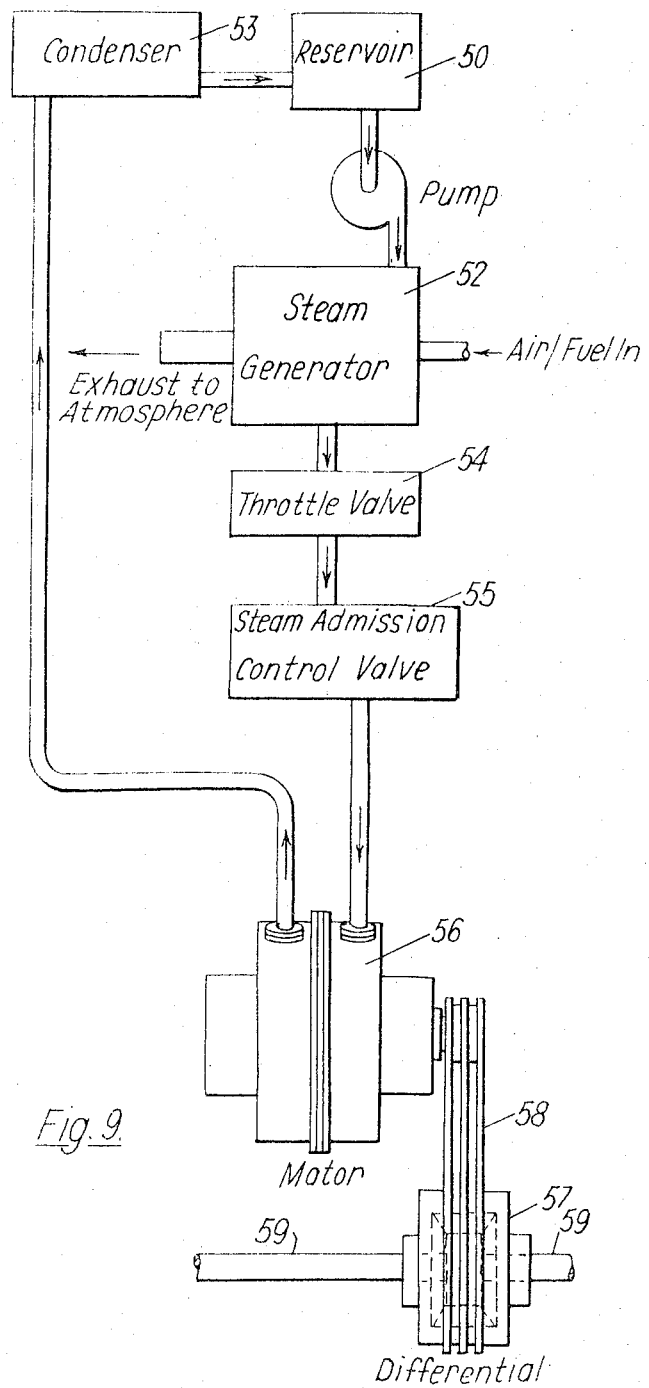

The invention will be more fully understood from the following description of a preferred embodiment thereof taken in conjunction with the accompanying drawings wherein FIG. 1 is a perspective view of a motor in assembled condition, FIG. 2 is an exploded perspective view of the motor illustrated in FIG. 1, FIG. 3 is a sectional elevation view of the motor taken along section plane 3—3 of FIG. 1, FIG. 4 is a perspective view of the interior of one chamber of the motor, FIG. 5 is a perspective view of a piston member and support bearings therefor shown removed from its chamber, FIG. 6 is an end elevation view of the motor taken along section plane 6—6 of FIG. 1 and showing the piston member disposed within the chamber at top-dead-centre position, FIGS. 7 and 8 are views similar to that illustrated in FIG. 6 but showing the piston member in successively different orbital positions within the chamber, and FIG. 9 shows a schematic arrangement of the motor connected in a torque delivery system.

In general, the motor as specifically illustrated in FIGS. 1 to 8 comprises two back-to-back mounted motors although, as previously mentioned, it may be constituted by a single unit.

The total or double unit illustrated comprises two similar housings 10 and 11 which are each cast (typically in an aluminium alloy) with integral fins 12, flanges 13 and a bearing compartment 14. The two housings 10 and 11 are bolted together at their flanges, with an intermediate (annular) dividing plate 15 being clamped therebetween, and end caps 16 are screwed or bolted to the free ends of the bearing compartments 14.

Each of the housings 10 and 11 is formed in its interior with a primary (cylindrical) chamber 17, which is defined by a circumferential wall 18 and an end wall 19, and a secondary chamber or pocket 20 which communicates with the primary chamber.

Separate (unvalved) inlet and exhaust ports 21 and 22 enter the chamber 17 through the circumferential wall 18, the respective ports being located one adjacent each side of the pocket 20, and the ports are connectable through forward and return lines (hereinafter referred to) with a source of high temperature, pressurised fluid.

A crank shaft 25 having two crank axles 26 extends longitudinally through the two housings 10 and 11 and through the intermediate dividing plate 15. The two crank axles 26 project in opposite (longitudinal) directions from an intermediate disc-shaped arm 27 and they are disposed 180 degrees out of phase with each other, as shown in FIGS. 2 and 3.

The crank shaft arm 27 locates within a central aperture 28 of the dividing plate 15 for free concentric rotation therein.

The crank axles 26 are formed at their opposite ends with integral spigots 29, the spigots being located in eccentric journals 30 of rotatable motion translating members 31 and 32.

The motion translating members 31 and 32 are supported for rotation by roller bearings 33 within the respective bearing compartments 14, and one of such members (i.e., member 32) is formed integral with an output drive delivery shaft 34.

In the construction described thus far, orbital motion of the crank axles 26 about the axis of the housings 10 and 11 and the dividing plate 15 will be translated into concentric rotation of the output shaft 34 by way of the motion translating members 31 and 32. Thus, the eccentric journal 30 in the members 31 and 32 should be a neat running fit on the respective shaft spigots 29.

Piston members 35 are journal mounted to each of the crank axles 26, the piston members being of generally cylindrical configuration and being sized to locate neatly and run (in an orbital path) between the respective faces of the dividing plate 15 and the end faces 19 of the respective chambers 17. The diameter of the piston members 35 is computed so to provide a small working clearance, in the order of 0.0002 – 0.001 inch, between the periphery thereof and the circumferential wall 18 of the chambers 17 during orbital motion of the piston members.

The piston members 35 are provided around a common pitch circle diameter with a series of longitudinally extending apertures 35 (FIG. 5), each of the apertures being adapted to receive a helical compression spring 37. Also, both end faces of the pistons are grooved at 38 to receive annular carbon seals 39. The seals may be backed with support rings, they although are not so shown in the drawings.

A radially extending partition member or tongue 40 is formed integral with each of the piston members and it projects into the pocket 20 of the respective housings 10 and 11, this being most clearly indicated in FIGS. 6, 7 and 8 of the drawings. The partition member is located in the respective pockets 20 by a pair of semi-cylindrical carbon support bearings 41, such bearings being in turn located in complementary sockets 42, and the partition member is apertured and grooved for receipt of compression springs and carbon seals (not shown) in similar manner to the piston members.

In operation of the device, the piston members 35 are constrained against rotation about their respective crank axles 26 by the partition members or tongues 40 but they are free to perform an oscillatory motion about their axles during successive orbital cycles. Then, during each orbital cycle of the piston members their respective tongues 40 will perform a cycle composed of both oscillatory and rectilinear movement.

FIGS. 6 to 8 of the drawings illustrate the motion of the piston members 35 within the chambers 17 during any one operational cycle of the motor. Thus, a pressurised fluid medium such as steam will enter the chamber through the inlet port 21 and expand to drive the piston member through a complete orbital cycle, the piston member 35, the tongue 40 and the walls of the chamber 17 co-operating to define an expansion zone which varies in volume from a minimum value to a maximum value during one complete orbital cycle of the piston member. Then, just prior to commencement of a new cycle (i.e., as the piston member just passes the exhaust port 22), the expansion zone will communicate with the exhaust port 22 and, thereafter, the expanded gas will be scavenged from the chamber.

During any one orbital cycle of the piston member, two zones of increasing and decreasing volume respectively will be swept; one zone constituting an expansion zone and the other an exhausting zone, as is shown most clearly in FIG. 7. However, as illustrated in FIG. 6, when the piston member is located in the top-dead-centre position (i.e., midway between two successive cycles), a single zone only will be defined and both the inlet and the exhaust ports will be in instantaneous communication.

It will be appreciated that, should a complete operational cycle of the device conclude with the piston member located in the top-dead-centre position, restarting of a motor composed of a single sided unit only may prove difficult without the provision of ancillary valves. Thus, the desirability of a double sided unit having piston members disposed out of phase one with the other.

The motor as above described is particularly applicable for employment as the power supply in an automobile. A complete power supply for use in an automobile is shown schematically in FIG. 9 of the drawings, and comprises:

a. a steam generation plant which includes, inter alia, a water reservoir 50, pump 51, steam generator 52 and condensor 53;
b. control valves 54 and 55;
c. a motor 56 as above described; and
d. a transmission system 57 coupled with the motor.

Referring firstly to the water/steam circuit: Water is pumped from the reservoir 50, through the pump 51 and into the generator where it is converted to super-heated steam at, for example, 400 pds. inch $^{-2}$ and 800°F. Steam from the generator is piped through a throttle valve 54, which is controlled manually to determine the quantity of steam passed to the motor, and then through a steam admission control valve 55 to the inlet ports entering each of the motor chambers 17.

Although the steam would normally be directed into the inlet ports of the chambers, the valve 55 (or, alternatively, a further valve) might be controlled manually to pass the steam into the reverse ports and thereby effect reverse drive at the motor shaft.

The steam exhausted from the motor is returned to the condensor 53, at which stage it is reconverted to water and returned to the reservoir 50. Thus, the entire circuit is formed as a closed loop.

The steam admission control valve 55 is controlled (or timed) to permit delivery of steam to the motor over a predetermined or selected portion of each cycle of the motor.

Various economiser devices may be incorporated in the circuit. For example, heat extracted from the steam in the condensor may be employed to preheat water passing from the reservoir into the generator.

Steam raising in the generator is effected by combustion of an air/fuel mixture, and exhaust gas from the generator is liberated to atmosphere.

Rotational output from the motor shaft is delivered, via a belt or chain drive 58, directly to a limited-slip differential 57, from which drive is delivered by way of half-shafts 59 to drive wheels.

The provision of a gearbox in the transmission system is not necessary. The torque output from the motor (i.e., the average torque) will be proportional to the steam pressure acting on the piston members and, assuming delivery of steam at constant pressure and temperature, the output torque will be approximately constant for all speed ranges.

Variations and modifications may be made in the embodiments of the motor and transmission system above described without departing from the scope of the invention. For example, while the device has been described in the context of a piston member being mounted for orbital motion within the chamber, the piston member might equally be held stationary and the housing be rotatable about the piston member. In this way motion might be transmitted to or from the housing body, it constituting, in a sense, a drive shaft.

Also, whereas the above described embodiment of the invention requires that the inlet and exhaust ports 21 and 22 be separated in the direction of orbital motion of the piston 35 and that the torque 40 be disposed between such ports, the motor might be constructed with the inlet and exhaust ports located side-by-side. Thus, by valving the inlet and exhaust ports and by locating a further port in the torque 40, such latter port being uncovered when the piston 35 is in its bottom-dead-centre position, exhaust gas may be scavenged from the motor chamber. It is not therefore essential to the invention in its fundamental form that the inlet and exhaust ports be separated in the direction of motion of the piston or that the torque be disposed between the ports.

I claim:

1. An energy conversion device comprising
   two opposed, in-line chambers, each generally cylindrical in form, mounted in back-to-back relationship, each having an axially extending pocket extending beyond its periphery,
   a common end wall separating said chambers,
   a generally cylindrical piston member mounted eccentrically within each chamber for orbital motion therein,
   inlet and exhaust ports opening into each chamber, the respective ports in each chamber being separated in the direction of orbital motion of the piston member,
   a partition member in the form of a tongue extending radially outwardly from the periphery of each piston member and into said pocket within the circumferential wall of the respective chambers and the partition members being supported within the respective pockets for pivotal and rectilinear movement, whereby, during any one orbital cycle of the piston members, there is in each chamber at least two zones of varying volume defined by the periphery of the piston member, the circumferential wall of the chamber and the partition member,
   a crank shaft extending in a longitudinal direction through the two chambers and through the common wall of the chambers, the crank shaft having out-of-phase crank axles which mount the piston members for said orbital motion within the respective chambers, and
   motion translating members journaled within the opposed end walls of the two chambers for rotation concentrically with the axis of the chambers' circumferential walls, the respective motion translating members each having eccentric journals therein which support and which are engaged in driving relationship with end portions of the respective crank axles of the crank shaft.

2. A device as claimed in claim 1 and constituting a steam motor, there being a rotatable drive shaft formed as an integral part of at least one of the motion translating members, and the piston members being drivable in the orbital path by the expansion of steam delivered into the chambers, through the respective inlet ports.

* * * * *